May 8, 1956

J. M. WALTER 2,744,450

RIGHT ANGLE ATTACHMENT FOR BORING, DRILLING AND MILLING MACHINES

Filed June 31, 1951

INVENTOR.
JOHN M. WALTER,
BY
*Allen & Allen*

ATTORNEYS.

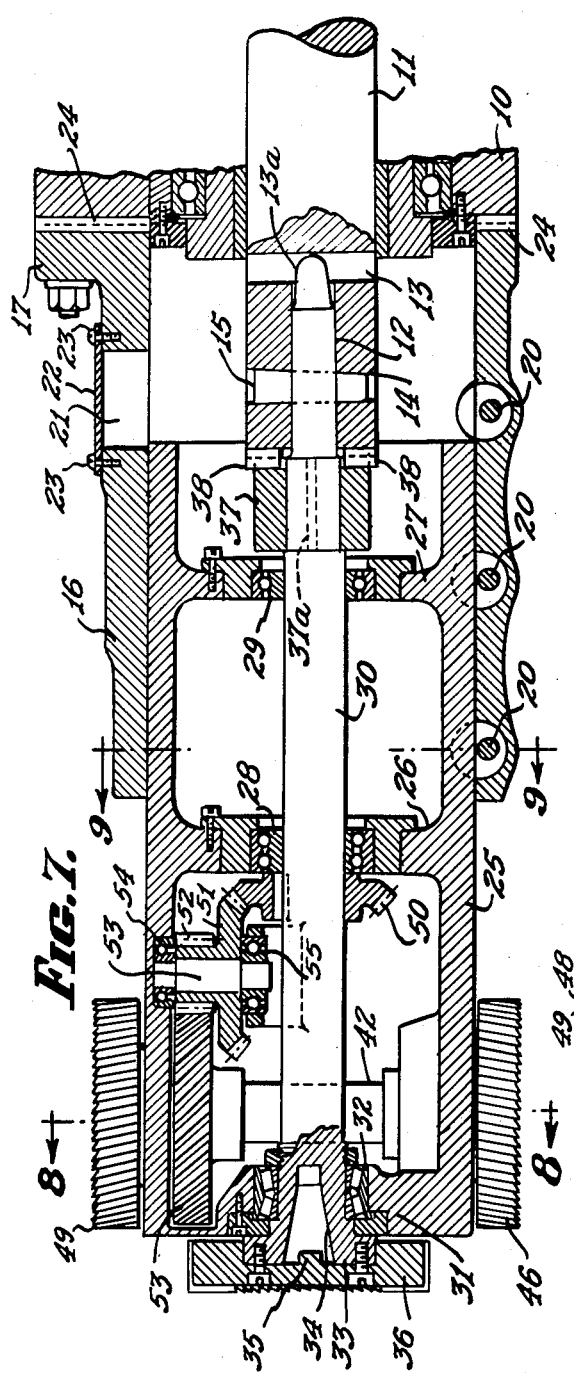
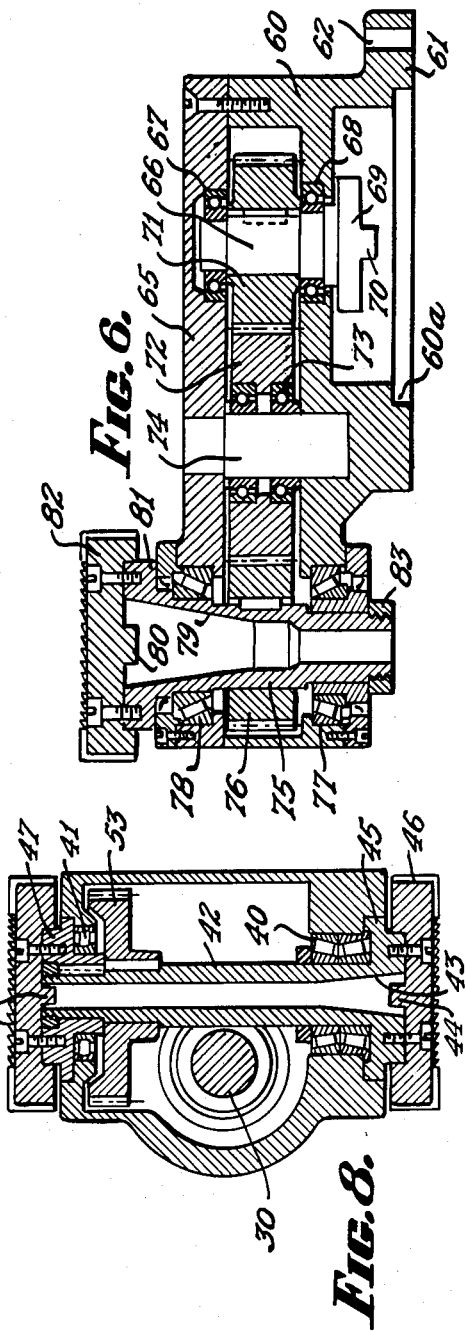

May 8, 1956   J. M. WALTER   2,744,450
RIGHT ANGLE ATTACHMENT FOR BORING, DRILLING
AND MILLING MACHINES
Filed June 31, 1951   3 Sheets-Sheet 3
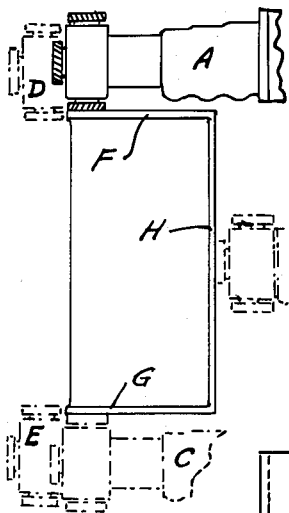
FIG. 11.
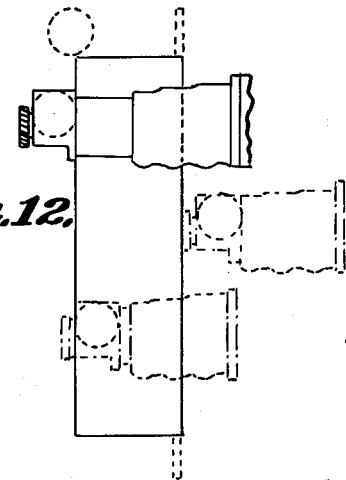
FIG. 12.
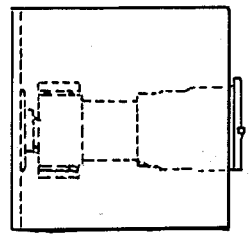
FIG. 14.
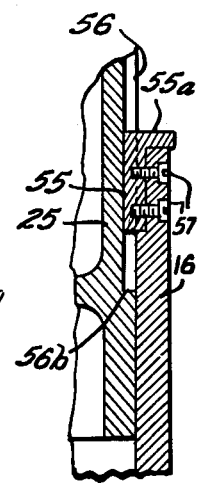
FIG. 13.
FIG. 10.
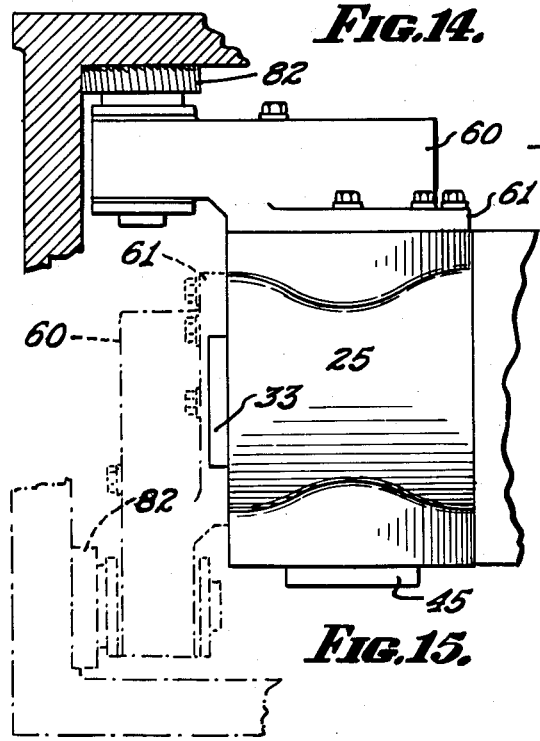
FIG. 15.
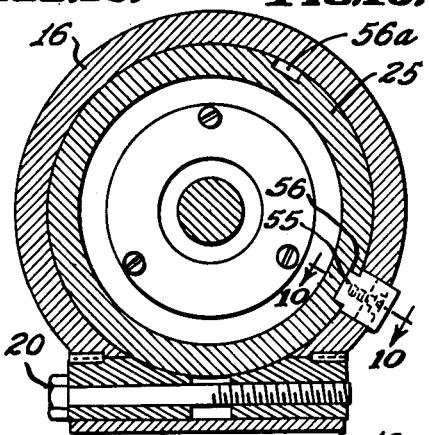
FIG. 9.
INVENTOR.
JOHN M. WALTER.
BY
ATTORNEYS.

United States Patent Office 2,744,450
Patented May 8, 1956

2,744,450

RIGHT ANGLE ATTACHMENT FOR BORING, DRILLING, AND MILLING MACHINES

John M. Walter, Cincinnati, Ohio, assignor to The G. A. Gray Company, Cincinnati, Ohio, a corporation of Ohio Application June 13, 1951, Serial No. 231,320

9 Claims. (Cl. 90—15)

This invention relates to a right angle attachment for use with horizontal boring, drilling and milling machines, as well as planer type milling machines.

Machines of the type mentioned above are generally provided with a head which can be traversed to a limited extent, the head being mounted on a column or the like wherein the column itself may be traversed. Mounted in such a head is a rotative spindle to which may be attached various types of rotary cutters. The spindle itself may be traversed to a limited degree with respect to the head. With machines of the type outlined above the type of work which can be done is limited by the fact that a rotating cutter secured to the end of the spindle rotates in a plane normal to the axis of the spindle. It is often desirable to have rotating cutters rotating in planes parallel to the axis of the spindle. It is therefore an object of the present invention to provide an attachment for use with machines of the type mentioned above which will provide, in addition to the conventional spindle, a supplementary spindle at right angles thereto and driven from the main spindle, upon which other rotating cutters may be mounted, so that such other rotating cutters can rotate in planes parallel to the axis of the spindle.

In machines of the type mentioned above the crosswise movement of the column is limited, and it is therefore another object of my invention to provide for a wider range of work coverage by adjustability in length of the attachment.

It is another object of the invention to provide a device as outlined by means of which multiple operations can be performed without the necessity of changing cutters and without the necesity of changing settings.

It is still another object of the invention to provide an attachment as outlined above which can be indexed to any desired angularity so that the supplementary spindle mentioned may be in a horizontal plane, in a vertical plane or in any desired angular plane between the horizontal and the vertical. It is still another object of the invention to provide an attachment which will provide a more rigid support for the cutters than the support which would normally result if the cutters were mounted directly on the end of a spindle extension. Still another object of the invention involves the provision of a supplementary offset spindle drive for use with the principal device of the invention which will give still greater flexibility insofar as the type of work which can be performed is concerned.

These and various additional objects of the invention which will be pointed out in greater detail hereinafter or which will be apparent to one skilled in the art upon reading these specifications, I accomplish by that certain construction and arrangement of parts of which I shall now disclose an exemplary embodiment, reference being had to the drawings forming a part hereof.

In the drawings:

Figure 6 is a detailed cross-sectional view taken on the line 6—6 of Figure 4 on an enlarged scale.

Figure 7 is a cross-sectional view taken on a line 7—7 of Figure 2 on an enlarged scale.

Figure 8 is a cross-sectional view taken on the line 8—8 of Figure 7.

Figure 9 is a cross-sectional view taken on the line 9—9 of Figure 7.

Figure 10 is a fragmentary cross-sectional view taken on the line 10—10 of Figure 9.

Figure 2:
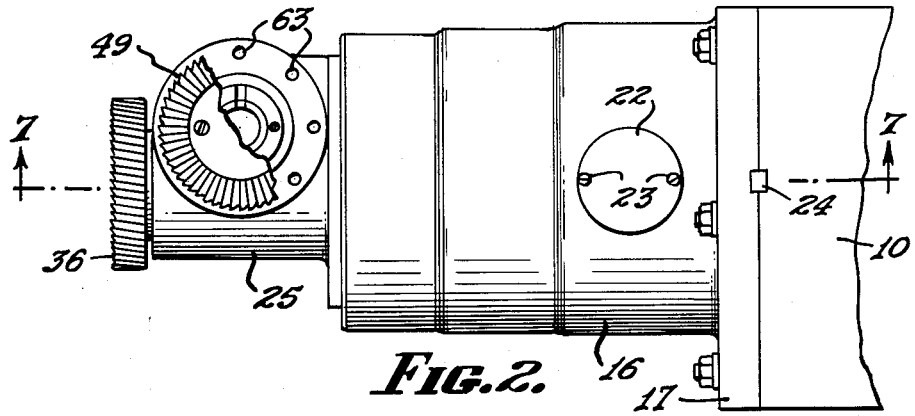
Figure 2 is a plan view of the same.

Figures 11 to 15 inclusive are diagrammatic representations showing different types of work which can be performed with the devices of the present invention.

Briefly, in the practice of my invention I provide an attachment comprising a main body portion which may be bolted or otherwise suitably secured to the end of the conventional head of the boring, drilling or milling machine. Telescoped in said body member I provide a quill head which is provided with internal bearings for a spindle extension which may be coupled with the spindle of the head and which spindle extension is provided with means for the attachment of a cutter to the end thereof and I provide drive take-off means within the quill head for a transverse short spindle on each end of which a cutter may be mounted.

Referring now in greater detail to the drawings, the conventional head of a boring, drilling or milling machine is indicated at 10, and a conventional spindle 11 is mounted for rotation in the head. The spindle 11 is provided at its end with the conventional Morse taper at 12 and a recess 13 for use with the tang type of tool shank. A transverse slot 14 is provided for use with a hold-back key 15.

The attachment according to the present invention comprises the body member 16 which is generally tubular in configuration and which is provided with the flange 17 by means of which it can be bolted to the head 10. The body member 16, as can best be seen in Figure 9, is actually in the form of a tube provided with the clamps 18 and 19. The clamp 19 is provided with a threaded hole and the clamp 18 with a simple hole and the bolts 20 can be used to draw the body clamps tightly against the quill head, which will be described hereinafter. The body member 16 is provided with the aperture 21 which in turn is provided with the cover plate 22 which may be held in place by screws 23. Through the aperture 21, when it is uncovered, access may be had to the hold-back key 15 for assembling and disassembling the device. In order to locate the member 16 upon the head 10 these parts may be provided with the cooperating key and keyway structure indicated at 24.

Coming now to a description of the quill head, this is indicated at 25. It is a generally cylindrical casting provided with the internal webs 26 and 27 in which are seated the ball bearings 28 and 29 for the long spindle 30. At its free end the quill head 25 is provided with the web 31 which carries the thrust type roller bearings 32 for the spindle 30. The end of the spindle 30 is provided with the flange 33 and the conventional taper 34, as well as the keyway 35, for the attachment of a cutter to the end thereof. Such a cutter is indicated at 36. Keyed to the spindle 30 at its inner end is a collar 37 and the spindle 11 is provided with the diametral keys 38 which engage in suitable notches in the collar 37. Driving torque is thus transmitted from the spindle 11 to the spindle 30 by virtue not only of the taper at 12 but also through the key 38 which engages slots in the spindle 11 and the collar 37 which is keyed to the spindle 30 by means of a key 37a.

The quill head 25 adjacent its outer end is provided with apertures within which are mounted the thrust type roller bearing 40 and the bearing 41 respectively for the hollow short spindle 42. This spindle 42 may be provided at one end with the conventional taper 43 and the slot 44 and the mounting flange 45 for the attachment of a cutter as at 46. At its other end the spindle 42 is provided with the mounting flange 47 and the slot 48 for mounting a cutter as at 49. The drive for the spindle 42 is achieved as follows. A bevel pinion 50 is keyed to the spindle 30 and engages a bevel pinion 51 which is integral with a helical pinion 52 mounted on a stub shaft 53, journaled in the bearings 54 and 55 in the casting of the quill head 25. The helical pinion 52 drives a helical gear 53 which is keyed to the hollow short spindle 42.

In the particular embodiment shown the hollow short spindle 42 is shown as being in a vertical position. It is held in this position as best seen in Figures 9 and 10 by means of the key 55 engaging in a keyway 56 in the quill head 25. The key 55 is provided with an upstanding shoulder 55a and is held in place by screws 57. By virtue of the upstanding shoulder 55a, after the screws 57 have been removed, the key may be knocked out quite easily. It may also be removed by traversing the spindle after the screws have been removed whereby the shoulder 56b bearing against the key, as the quill head 25 is moving upward as seen in Figure 10, will free the key 55.

An additional keyway 56a is provided which is similar to the keyway 56 but disposed 90° away from the keyway 56 annularly of the quill head. By loosening the bolt 20 and withdrawing the key 55 the quill head may be rotated through 90° in relation to the body member and the key 55 may then be inserted in the keyway 56a, as a result of which the short spindle 42 may be located in a horizontal plane. If it is desired to orient the short spindle in some other position than horizontal or vertical, the key 55 is not used and reliance may be had upon the bolts 20 to hold the quill head in a desired position of adjustment. Generally speaking, this will be a rare occasion and for most practical purposes it will be desirable to use a device with the short spindle, either in a vertical or in a horizontal position.

Figure 1:
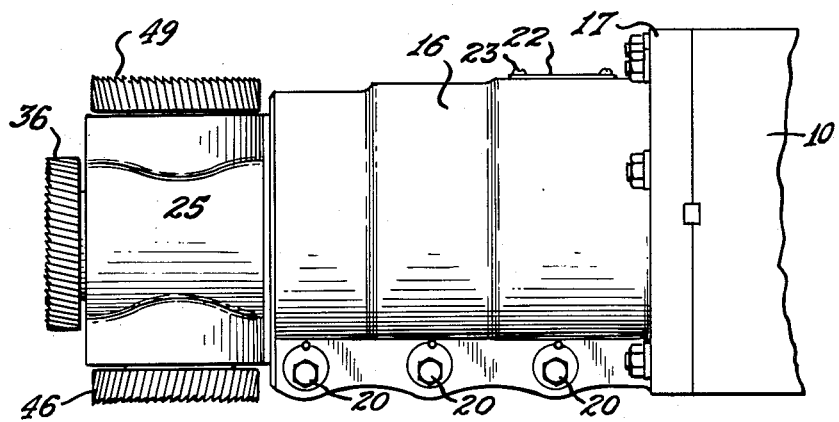
Figure 1 is a side elevational view of the right angle attachment showing it in relation to the conventional head which is shown fragmentarily.
Figure 3:
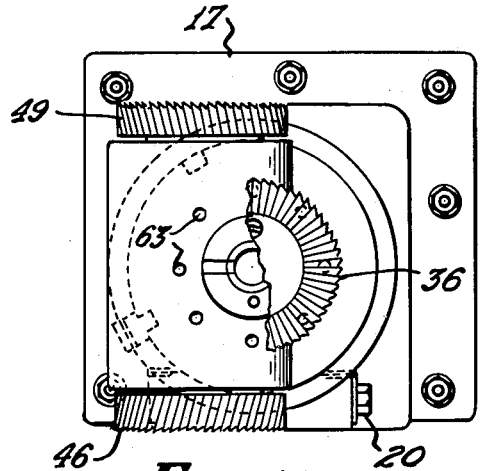
Figure 3 is an end elevational view of the same.
Figure 4:
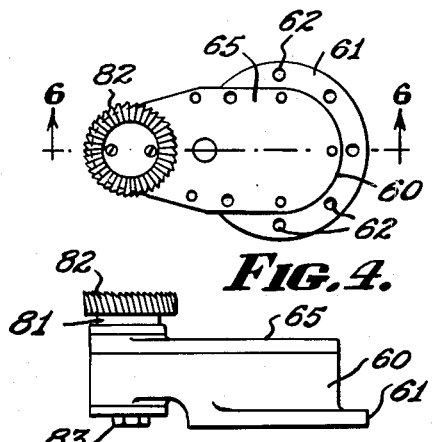
Figure 4 is an elevational view of the offset spindle drive device which may be used with the device of Figures 1 to 3.
Figure 5:
Figure 5 is a plan view of the same.

In Figures 4, 5 and 6 I have shown an offset spindle drive which may be used with the device thus far described. This device comprises a main body member 60 having a circular flange 61 provided with bolt holes 62 equally spaced around its periphery. It should be noted that the quill head is provided with equally spaced bolt holes, as best seen in Figures 1 and 3 at 63, under each of the cutters 36, 46 and 49, so that the device of Figures 4 to 6 inclusive may be bolted onto the quill head in place of any one of the three cutters shown. Furthermore, by virtue of the fact that the bolt holes in the quill head and on the flange 61 are equal in number and equally spaced, the attachment of Figures 4 to 6 may be secured in any one of eight positions so that there are twenty-four possible ways in which the device of Figures 4 to 6 may be secured to the quill head. A cover plate 65 is bolted to the member 60 and a stub shaft 66 has a bearing at 67 in the cover plate and at 68 in the member 60. The stub shaft 66 is provided with the drive flange 69 having the key 70 by means of which it may be engaged with the keyway 35, 48 or 44. The stub shaft 66 carries a pinion 71 which drives a pinion 72 mounted by means of the bearings 73 on the stub shaft 74 which is fixed in the member 60 and the cover plate 65. A short hollow spindle 75 carrying the pinion 76, which is driven by the pinion 72, is mounted in the bearings 77 and 78 in the member 60 and the cover plate 65 respectively. The spindle 75 has the conventional taper 79, the keyway 80 and the flange 81 for the mounting of a cutter 82. The screw collar 83 holds the spindle in place. The attachment is centered on the quill head by the counterbore 60a which fits over a pilot boss.

Referring now to Figures 11 to 15 inclusive, I have shown various operations which may be accomplished with the device according to the invention. In Figure 11 I have shown diagrammatically how three sides of a casting may be face milled and two sides may be peripheral milled. Assuming that in Figure 11 we have a plan view of the casting, at A one side of the casting is being face milled by the cutter on one end of the short spindle; at B another face of the casting is being face milled by the cutter on the end of the long spindle; and at C the opposite side of the casting is being face milled with the cutter at the opposite end of the short spindle. At D one edge of the casting is being peripheral milled by the same cutter which was used to face mill in position A, while in position E the same cutter is being used to peripheral mill an edge of the casting as was used to face mill the side of the casting in position C. Thus five facing jobs are accomplished without the need for changing cutters.

With the explanation in connection with Figure 11 the representation of Figure 12 will be understandable in that various positions of the right angle attachment are shown for face milling and peripheral milling different portions of an exemplary casting.

In Figure 14 I have shown diagrammatically how conveniently an inside wall of the casting may be face milled with the device according to the present invention. In Figure 13 I have shown diagrammatically how not only can outside portions of the casting be face milled and peripheral milled, but inside portions of the casting if it is hollow may be face milled without the need for changing cutters.

In Figure 15 I have shown how the attachment of Figures 4 to 6 inclusive may be used for face milling all the way into the corner of an inside face of a casting. This can be done in the solid line position of the device, as well as in the broken line position of the device wherein the attachment is driven by the long spindle rather than by the short transverse spindle.

From the foregoing description it will be seen that I have provided a tool or attachment of very flexible utility in that a multiplicity of milling jobs can be accomplished without the need for changing cutters. This, of course, reduces set-up time in the plant and reduces manufacturing costs. The operation of Figure 15 in the past could only be accomplished by the use of very large cutters, and such cutters are extremely expensive, very difficult to set up and subject the machine to a tremendous amount of vibration.

Numerous modifications will of course suggest themselves to those skilled in the art, and I therefore do not intend to limit myself as to any of the details of construction illustrated. The various details are shown by way of example, and what I claim as new and desire to secure by Letters Patent is:

1. An attachment for boring, drilling and milling machines having a traversing head and a rotatable and traversable spindle in said head, comprising a generally tubular body member having means for securing it to said head about said spindle, a generally tubular quill head in telescoping relation with said body member, a long spindle rotatably mounted in said quill head coaxially with said first named spindle and having means at one end for directly connecting it to said first mentioned spindle and having means at its other end for securing a cutter thereto, said quill head carrying also rotatably a short spindle disposed with its axis transverse to that of said long spindle, means for drivingly connecting said short spindle to said long spindle, and means at an end of said short spindle for securing a cutter thereto.

2. An attachment according to claim 1, wherein means are provided at both ends of said short spindle for securing cutters thereto.

3. An attachment according to claim 1, wherein said tubular body member is provided with means for clamping it tightly about said quill head.

4. An attachment according to claim 1, wherein a keyway is provided in said quill head, and a key is secured to said body member to locate said quill head with said short spindle in a predetermined angular position.

5. An attachment according to claim 1, wherein two keyways are provided in said quill head spaced ninety degrees apart peripherally of said quill head, and a key is securable to said body member in a fixed location such that when said key is engaged in one of said keyways said short spindle is vertically disposed, and when said key is engaged in the other of said keyways said short spindle is horizontally disposed.

6. An attachment according to claim 1, in which the means for drivingly connecting said short and long spindles comprises a first bevel pinion fixed on said long spindle, a second bevel pinion rotatably mounted in said quill head and meshing with said first bevel pinion, a spur pinion integral with said second bevel pinion, and a spur gear fixed on said short spindle and meshing with said spur pinion.

7. In combination with an attachment according to claim 1, an offset parallel spindle drive comprising a connecting spindle and a stub spindle, means on said connecting spindle for driving engagement selectively with either end of said short spindle or with said long spindle, means on said stub spindle for mounting a cutter thereon, means for drivingly connecting said connecting spindle and said stub spindle, said drive having means for mounting it on said attachment with said connecting spindle in driving engagement with either end of said short spindle or said long spindle.

8. An attachment according to claim 1, wherein said quill head around the end of said long spindle and around each end of said short spindle is provided with an equal number of equally spaced threaded holes for attachment of an offset spindle drive.

9. In combination with an attachment according to claim 8, an offset parallel spindle drive comprising a connecting spindle and a stub spindle, means on said connecting spindle for driving engagement selectively with either end of said short spindle or with said long spindle, means on said stub spindle for mounting a cutter thereon, means for drivingly connecting said connecting spindle and said stub spindle, said drive comprising a mounting flange having a number of holes equal in number and spacing to the holes on said quill head, whereby said drive may be mounted in a plurality of orientations equal to the number of said holes on either end of said short spindle or on said long spindle.

References Cited in the file of this patent

UNITED STATES PATENTS

| | | |
|---|---|---|
| 642,712 | Parker | Feb. 6, 1900 |
| 1,212,330 | Daly | Jan. 16, 1917 |
| 1,403,555 | Jolls | Jan. 17, 1922 |
| 1,516,543 | Meier | Nov. 25, 1924 |
| 1,878,707 | Johnson | Sept. 20, 1932 |
| 1,933,575 | Woytych | Nov. 7, 1933 |
| 1,937,408 | Johnson | Nov. 11, 1933 |
| 1,971,299 | Fickett et al. | Aug. 21, 1934 |
| 2,097,692 | Fiegel | Nov. 2, 1937 |
| 2,227,410 | Johnson | Dec. 31, 1940 |
| 2,305,107 | Premo | Dec. 15, 1942 |
| 2,356,506 | Clausen | Aug. 22, 1944 |
| 2,650,521 | Steinbrecker | Sept. 1, 1953 |